(12) United States Patent
Inoue et al.

(10) Patent No.: US 8,331,435 B2
(45) Date of Patent: Dec. 11, 2012

(54) COMPRESSION SYSTEM, PROGRAM AND METHOD

(75) Inventors: Hiroshi Inoue, Yokohama (JP); Takao Moriyama, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 12/361,648

(22) Filed: Jan. 29, 2009

(65) Prior Publication Data

US 2009/0207172 A1    Aug. 20, 2009

(30) Foreign Application Priority Data

Jan. 30, 2008 (JP) ................................ 2008-019281

(51) Int. Cl.
H04N 13/04 (2006.01)
H04N 7/12 (2006.01)
(52) U.S. Cl. ................ 375/240.01; 375/240.16; 348/51; 345/419
(58) Field of Classification Search .............. 375/240.01, 375/240.16; 345/419, 506, 427; 348/51
See application file for complete search history.

(56) References Cited

U.S. PATENT DOCUMENTS

| | | | | |
|---|---|---|---|---|
| 5,710,875 A | * | 1/1998 | Harashima et al. | 345/419 |
| 6,157,396 A | * | 12/2000 | Margulis et al. | 345/506 |
| 7,894,525 B2 | * | 2/2011 | Piehl et al. | 375/240.16 |
| 2005/0163218 A1 | * | 7/2005 | Le Clerc et al. | 375/240.16 |

FOREIGN PATENT DOCUMENTS

| | | |
|---|---|---|
| JP | 08-161505 A | 6/1996 |
| JP | 2004-517590 A | 6/2004 |
| JP | 2004-320804 A | 11/2004 |

* cited by examiner

*Primary Examiner* — Gims Philippe
(74) *Attorney, Agent, or Firm* — Scully, Scott, Murphy & Presser, P.C.; Gail H. Zarick, Esq.

(57) ABSTRACT

An object is to calculate an accurate motion vector with a small computational effort. To this end, provided is a system for compressing a motion picture generated by projecting objects onto a screen, the objects moving relatively to the screen in a 3D space, the system including: a motion calculating component which calculates a motion vector of the object within the screen by projecting onto the screen a motion of the object in the 3D space between a time corresponding to a compression target frame and a time corresponding to another frame; and a compressing component which compresses the compression target frame by motion compensation based on the motion vector.

12 Claims, 14 Drawing Sheets

COMPRESSION SYSTEM, PROGRAM AND METHOD

CROSS-REFERENCE TO RELATED APPLICATIONS

This application claims priority under 35 U.S.C. §119 from Japanese Patent Application No. 2008-19281 filed Jan. 30, 2008, the entire contents of which are incorporated herein by reference.

BACKGROUND OF THE INVENTION

1. Field of the Invention

The present invention relates to a compression system, a program and a method for compressing a motion picture. More particularly, the present invention relates to a compression system, a program and a method for compressing a motion picture generated by projecting objects in a three-dimensional (3D) space onto a screen.

2. Description of the Related Art

In a software application for displaying a virtual world such as the 3D Internet and online games, the process of rendering objects from a 3D space onto a two-dimensional (2D) screen is performed by a client. However, when the client does not have sufficient processing capabilities, a server, instead of the client, renders the objects from the 3D space onto the 2D screen. Moreover, the server transmits a result of rendering to the client after compressing the result by use of a motion picture compression method such as MPEG (Moving Picture Experts Group).

In the motion picture compression method such as MPEG, a difference image between an uncompressed image and a predicted image predicted from a reference image by motion compensation is calculated for a frame to be compressed, referred to as a compression target frame. This difference image is image-compressed by DCT (discrete cosine transform) or the like. Such motion picture compression method enables efficient compression using motion compensation based on a motion vector.

When accurate motion compensation is performed, the difference image is reduced in size. When the difference image is small, a size of compressed data is also reduced. Therefore, in the case where a motion picture is compressed by motion compensation based on the motion vector, detection of an accurate motion vector is important for enhancing compression efficiency. However, a computational effort for detecting the motion vector takes up a large part of motion picture compression processing. Accordingly, when the computational effort required for motion vector detection processing is increased in order to enhance the compression efficiency, the entire processing speed for the compression processing is slowed down and, as a result, the processing cost is also increased.

SUMMARY OF THE INVENTION

It is an object of the present invention to provide a system, a method, and a program that can solve the foregoing problems.

According to an aspect of the present invention, there is provided a system for compressing a motion picture generated by projecting objects onto a screen, the objects moving relatively to the screen in a 3D space, the system including: a motion calculating component which calculates a motion vector of the object within the screen by projecting onto the screen a motion of the object in the 3D space between a time corresponding to a compression target frame and a time corresponding to another frame; and a compressing component which compresses the compression target frame by motion compensation based on the motion vector.

Also provided is a computer readable article of manufacture tangibly embodying computer readable instructions to control a system for compressing a motion picture generated by projecting an object onto a screen, the object moving relatively to the screen in a 3D space, wherein the program allows the computer to function as:

a motion calculating component which calculates a motion vector of the object within the screen by projecting onto the screen a motion of the object in the 3D space between a time corresponding to a compression target frame and a time corresponding to the another frame; and a compressing component which compresses the compression target frame by motion compensation based on the motion vector.

According to another aspect of the present invention, there is provided a method for compressing a motion picture generated by projecting an object onto a screen, the object moving relatively to the screen in a 3D space, the method comprising the steps of:

calculating a motion vector of the object within the screen by projecting onto the screen a motion of the object in the 3D space between a time corresponding to a compression target frame and a time corresponding to another frame; and compressing the compression target frame by motion compensation based on the motion vector.

Further, a computer readable article of manufacture tangibly embodying computer readable instructions for executing the steps of a method of compressing a motion picture generated by projecting an object onto a screen, the object moving relatively to the screen in a 3D space, the method comprising:

calculating a motion vector of the object within the screen by projecting onto the screen a motion of the object in the 3D space between a time corresponding to a compression target frame and a time corresponding to another frame; and compressing the compression target frame by motion compensation based on the motion vector.

The above summary of the invention does not list all necessary features of the present invention so that sub-combinations of groups of these features are also included in the present invention.

BRIEF DESCRIPTION OF THE DRAWINGS

For more complete understanding of the present invention, reference is now made to the following description taken in conjunction with the accompanying drawings.

DETAILED DESCRIPTION OF THE PREFERRED EMBODIMENTS

The present invention and advantages thereof are described through its preferred embodiments. However, they are not intended to limit the present invention.

Figure 1:
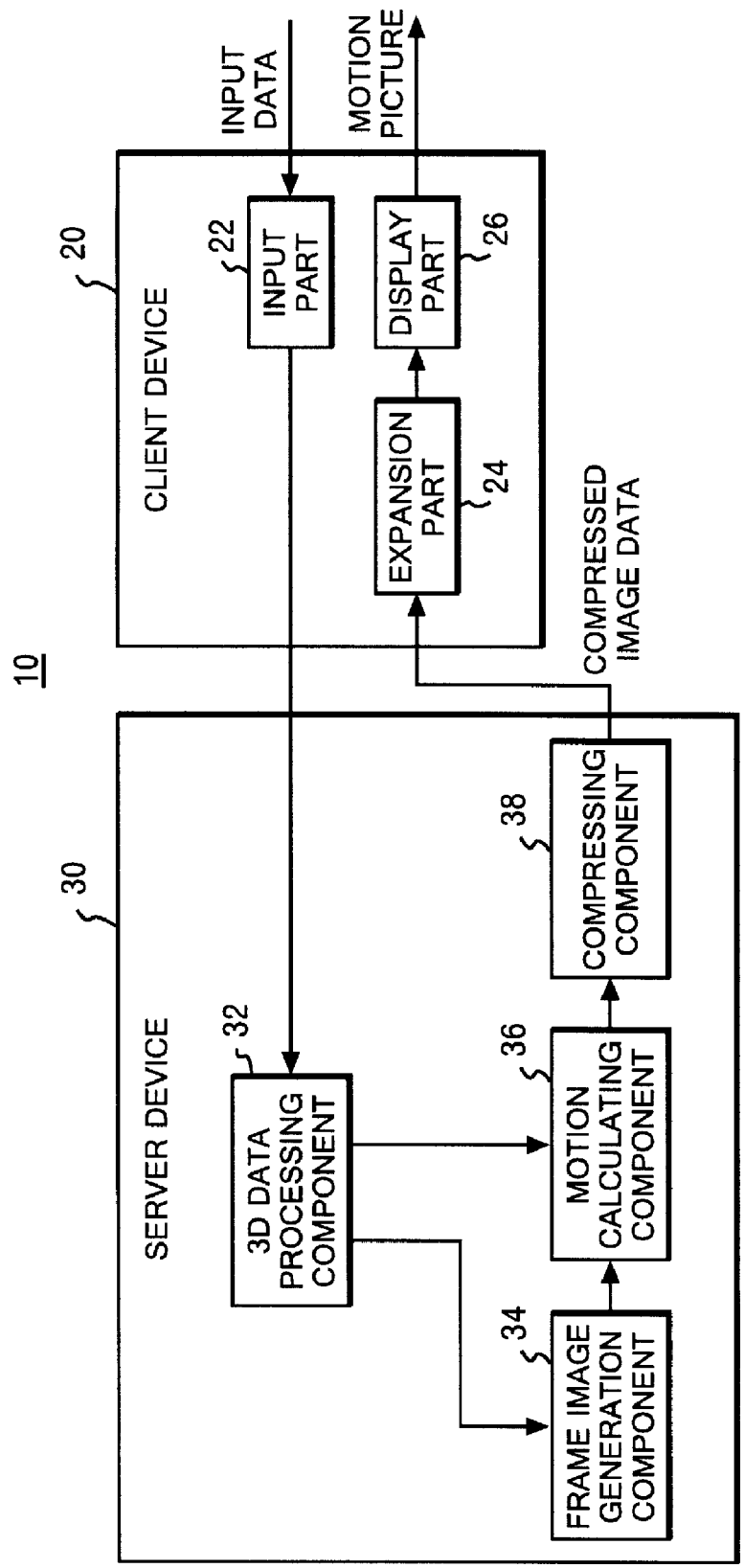
FIG. 1 shows a configuration of an information providing system 10 according to an embodiment of the present invention.

Referring to FIG. 1, a configuration of an information providing system 10 according to an embodiment of the present invention is shown. The information providing system 10 displays one or more 3D objects in a 3D space on a display of a client device 20 used by a user. For example, the information providing system 10 displays, as motion pictures, motions associated with relative movements of the user's viewpoint in the 3D space and the objects present in the 3D space to each other.

For example, the information providing system 10 may simulate a virtual world in which one or more users move, for example, in a virtual space. Moreover, the object in the 3D space may be an avatar that functions as the other self of the user in the virtual world and may be other characters, objects or the like present in the virtual world.

The information providing system 10 includes the client device 20 and a server device 30. The client device 20 has an input part 22, an expansion part 24 and a display part 26.

The client device 20 receives input data inputted by the user and transmits the received input data to the server device 30. The expansion part 24 receives compressed image data outputted by the server device 30 and expands the received compressed image data into uncompressed motion picture data. Thereafter, the display part 26 displays the uncompressed motion picture data expanded by the expansion part 24.

The server device 30 executes data processing for one or more 3D objects moving within the virtual 3D space. As an example, the server device 30 may execute processing of moving a position of the object in the 3D space according to an instruction or the like from the client device 20.

Furthermore, the server device 30 generates a motion picture by projecting an object onto a screen provided in the 3D space, the object moving relatively to the screen. As an example, the server device 30 may set the screen in the 3D space according to a viewing field of the object (for example, the avatar) which represents the user. Furthermore, as another example, the server device 30 may set position and size of the screen in the 3D space according to movement of the viewpoint of the object representing the user, a change in the object's viewing field or the like. Thereafter, the server device 30 generates the compressed image data by compressing the generated motion picture.

In the processing of generating the motion picture, the server device 30 generates 2D images of each object by projecting the object onto the screen at each time corresponding to each screen (frame) of a motion picture to be generated. Thereafter, the server device 30 generates the motion picture based on the 2D images of the object projected onto the screen at each time corresponding to each frame. Subsequently, the server device 30 transmits to the client device 20 compressed motion picture data obtained by compressing the motion picture. Note that, as a method for projecting the object in the 3D space onto the screen, technologies such as a ray-tracing technique and a Z-buffer method have been widely known. Thus, description thereof will be omitted except for the points highly associated with the present application.

The server device 30 has a 3D data processing component 32, a frame image generation component 34, a motion calculating component 36 and a compressing component 38. The 3D data processing component 32 performs data processing for the movement of the object or the like within the 3D space. As an example, the 3D data processing component 32 may process numeric data indicating position, size, shape, velocity vector (information indicating a movement speed and a movement direction), texture and the like of the object in the 3D space. As another example, the 3D data processing component 32 may simultaneously change numeric data indicating positions, sizes, shapes, velocity vectors (information indicating movement speeds and movement directions), textures and the like of a plurality of objects in the 3D space according to instructions from a plurality of the client devices 20.

The frame image generation component 34 generates a motion picture by sequentially projecting each object in the 3D space onto the screen, the objects being processed by the 3D data processing component 32 at each time corresponding to each of frames of the motion picture. As an example, the frame image generation component 34 may set the position and size of the screen according to a viewpoint and a view angle in the 3D space set by the client device 20 or the like. Moreover, the frame image generation component 34 may generate an image projected onto the screen based on the numeric data received from the 3D data processing component 32, the data indicating the position, size, shape, texture and the like of each object in the 3D space.

The motion calculating component 36 calculates a motion vector in each frame of the motion picture generated by the frame image generation component 34. The motion calculating component 36 divides one screen (frame) of the motion picture into a plurality of regions and calculates the motion vector for each of the plurality of divided regions. As an example, the motion calculating component 36 may divide the frame into a plurality of rectangular blocks and calculate the motion vector so as to be associated with each of the plurality of divided rectangular blocks.

The motion vector is a vector which specifies a position of an image in another frame which is not to be compressed at this point, the image being closely related to an image in the region associated with the motion vector in one frame (compression target frame) to be compressed in the motion picture. Another frame whose region is specified by the motion vector may be a frame that comes before or after the compression target frame in terms of time. Moreover, a bidirectional motion vector in another frame that comes before or after one compression target frame in terms of time may be calculated.

Furthermore, the motion calculating component 36 calculates a motion vector of an object within the screen by projecting onto the screen a motion of the object in the 3D space between a time corresponding to the compression target frame and a time corresponding to another frame. As an example, the motion calculating component 36 may calculate the motion vector by acquiring, from the 3D data processing component 32, 3D motion information indicating relative motion of each object to the screen within the 3D space and by converting the acquired motion information into 2D motions on the screen. Thus, the motion calculating component 36 can calculate the motion vector with a very small computational effort compared with the case where the motion vector is calculated, for example, by computing an image correlation between the compression target frame and the other frame.

The compressing component 38 compresses the compression target frame by motion compensation based on the motion vector. Specifically, the compressing component 38 compresses frame by frame the uncompressed motion picture generated by the frame image generation component 34 by use of a motion picture compression method using the motion compensation based on the motion vector. As an example, the compressing component 38 may generate compressed image data by using the motion picture compression method such as MPEG-1, MPEG-2, MPEG-4 and H.264 to compress the motion picture data outputted by the image generation component 34. Thereafter, the compressing component 38 transmits the compressed image data generated to the client device 20.

As described above, the information providing system 10 calculates the motion vector of the object within the screen by projecting onto the screen the motion of the object in the 3D space. Thus, the information providing system 10 enables calculation of an accurate motion vector with a small computational effort.

Figure 2:
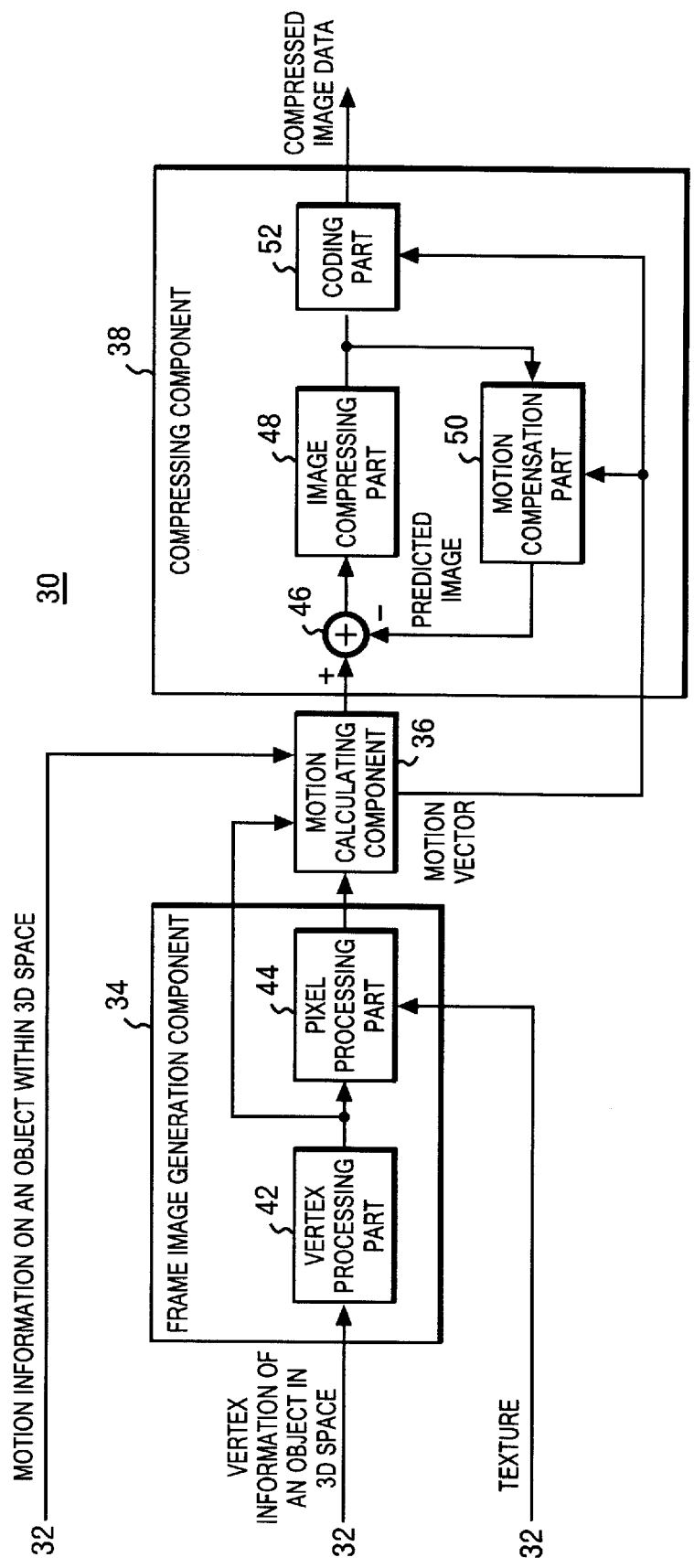
FIG. 2 shows an example of a configuration of a server device 30 according to the embodiment.

FIG. 2 shows an example of a configuration of the server device 30 according to this embodiment. Note that the 3D data processing component 32 is omitted in FIG. 2.

As an example, the frame image generation component 34 may include a vertex processing part 42 and a pixel processing part 44. The vertex processing part 42 receives information indicating a vertex position of each object (for example, surface positions of the objects) in the 3D space, which are processed by the 3D data processing component 32. Thereafter, the vertex processing part 42 projects the received information indicating vertexes onto the screen, thereby converting the information into information indicating the vertexes of the objects on the screen. Thus, the vertex processing component 42 can calculate shapes of the objects in the 3D space when the objects are projected onto the screen. Note that, as an example, in the case where a plurality of objects in the 3D space overlap with each other in the front and back when seen from the viewpoint, the vertex processing part 42 may calculate the shape of each of the objects projected onto the screen by selecting a vertex of the object positioned closest to the front of the screen.

The pixel processing part 44 receives information indicating texture of each object in the 3D space that is processed by the 3D data processing component 32. The pixel processing part 44 generates color information on each of pixels by assigning a corresponding texture to each of the shapes of the objects, which are calculated by the vertex processing part 42. Thereafter, the vertex processing part 42 and the pixel processing part 44 execute the above processing for each frame.

Thus, the frame image generation component 34 can generate the uncompressed motion picture by projecting each of the objects onto the screen.

The motion calculating component 36 calculates the motion vector by receiving the information from the 3D data processing component 32, the vertex processing part 42 and the pixel processing part 44. A detailed flow of operations executed by the motion calculating component 36 will be described with reference to FIG. 3.

As an example, the compressing component 38 may include a residual calculating part 46, an image compressing part 48, a motion compensation part 50 and a coding part 52. The residual calculating part 46 receives an uncompressed image in the compression target frame from the motion calculating component 36. Moreover, the residual calculating part 46 receives a predicted image in the compression target frame from the motion compensation part 50. The residual calculating part 46 calculates a difference image (predicted residual image) for the compression target frame by subtracting the predicted image from the uncompressed image.

The image compressing part 48 compresses the difference image calculated by the residual calculating part 46. As an example, the image compressing part 48 may compress the difference image by DCT conversion and quantization process.

The motion compensation part 50 expands the difference image compressed by the image compressing part 48 into an uncompressed difference image (reference image). As an example, the motion compensation part 50 may expand the compressed difference image into the uncompressed difference image by inverse quantization process and inverse DCT conversion.

The motion compensation part 50 generates the predicted image in the compression target frame by performing motion compensation based on a motion vector. Specifically, the motion compensation part 50 generates an image in each of a plurality of regions (for example, rectangular blocks) obtained by dividing the compression target frame, based on an image in another frame (the reference image) specified by a motion vector associated with the region. Thereafter, the motion compensation part 50 transmits the predicted image generated to the residual calculating part 46.

The coding part 52 performs variable length coding for the difference image compressed by the image compressing part 48, the motion vector calculated by the motion calculating component 36 and other control data. Thereafter, the coding part 52 generates compressed image data by multiplexing the variable length coded difference image, motion vector and control data.

The compressing component 38 as described above can convert the uncompressed motion picture data generated by the frame image generation component 34 into the compressed image data by use of the motion picture compression method using the motion compensation based on the motion vector. Specifically, the compressing component 38 can compress a difference image obtained by subtracting an image in a region in another frame from an image in a region including an object projected onto the compression target frame, the another frame being specified by a motion vector associated with the region including the object.

Figure 3:
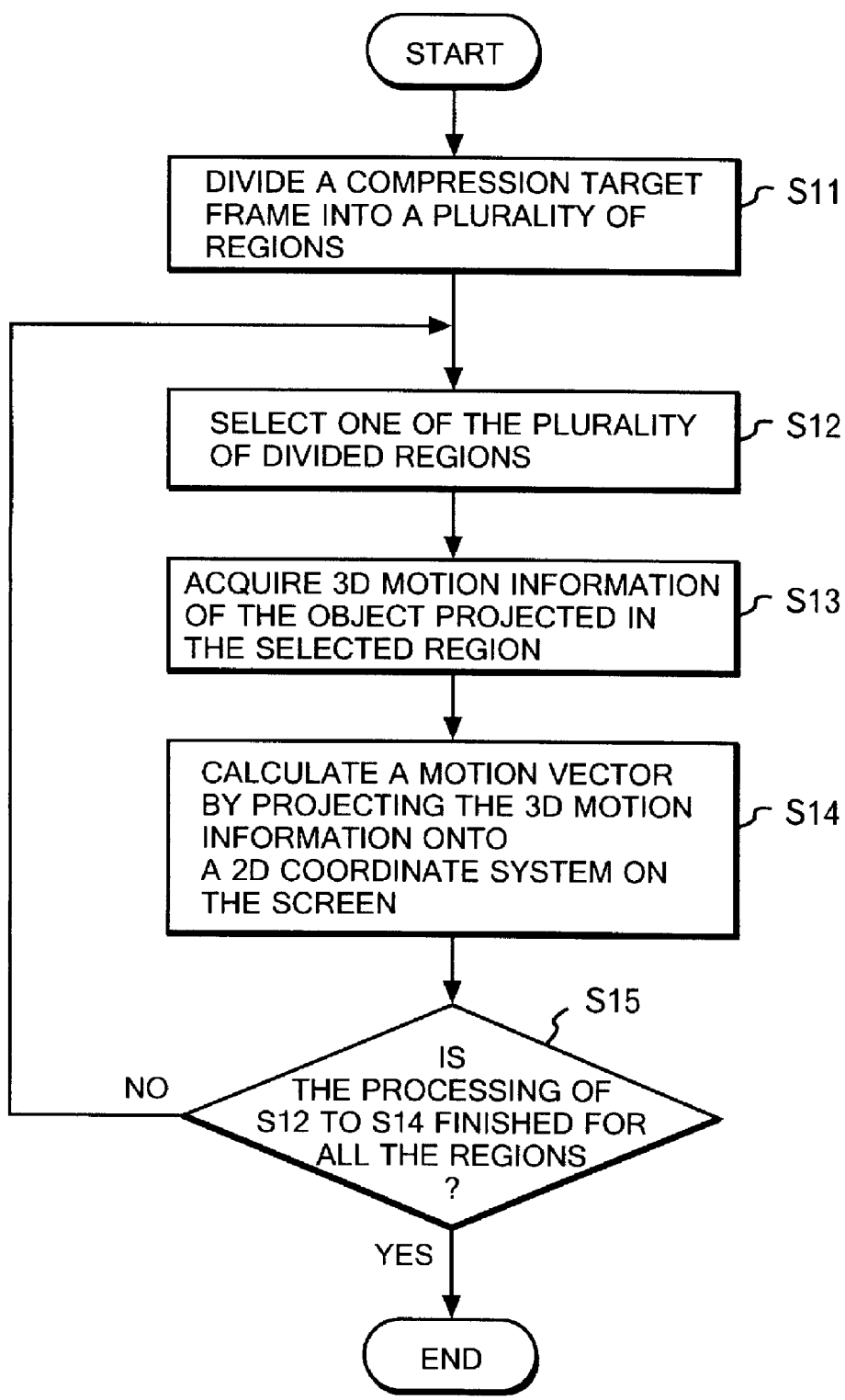
FIG. 3 shows an example of a flow of processing executed by a motion calculating component 36 according to the embodiment.

FIG. 3 shows an example of a flow of processing executed by the motion calculating component 36. The motion calculating component 36 repeatedly executes processing of Steps S11 to S15 for each frame.

First, the motion calculating component 36 divides the compression target frame into a plurality of regions (S11). As an example, the motion calculating component 36 may divide the compression target frame into rectangular blocks having a size of 4×4 pixels, 4×8 pixels, 8×8 pixels, 16×16 pixels or the like.

Thereafter, the motion calculating component 36 selects one of the plurality of divided regions (S12). Subsequently, the motion calculating component 36 specifies an object projected in the selected region and acquires motion information (such as a velocity vector in the 3D space) indicating a motion of the specified object within the 3D space (S13).

Thereafter, the motion calculating component 36 calculates a motion vector indicating a 2D motion on the screen by projecting the 3D motion information onto a 2D coordinate system on the screen (S14). Subsequently, the motion calculating component 36 associates the calculated motion vector with the selected region. Note that, here, when a plurality of objects are present in the 3D space, the motion calculating component 36 may associate with the selected region a motion vector calculated for an object positioned closest to the front of the region, for example. Thus, even in the case where a plurality of objects overlap with each other in the front and back when seen from the viewpoint, the motion of the object projected onto the screen can be reflected on the motion vector by the motion calculating component 36.

Thereafter, the motion calculating component 36 determines whether or not the processing of Steps S12 to S14 is finished for all the regions (S15). If the processing is not finished for all the regions (NO in S15), the motion calculating component 36 returns the processing to Step S12 and executes the processing for the next region. On the other hand, if the processing is finished for all the regions (YES in S15), the motion calculating component 36 terminates the processing for the current frame. By executing the above processing, the motion calculating component 36 can calculate the motion vectors for all the regions in the frame.

Figure 4:
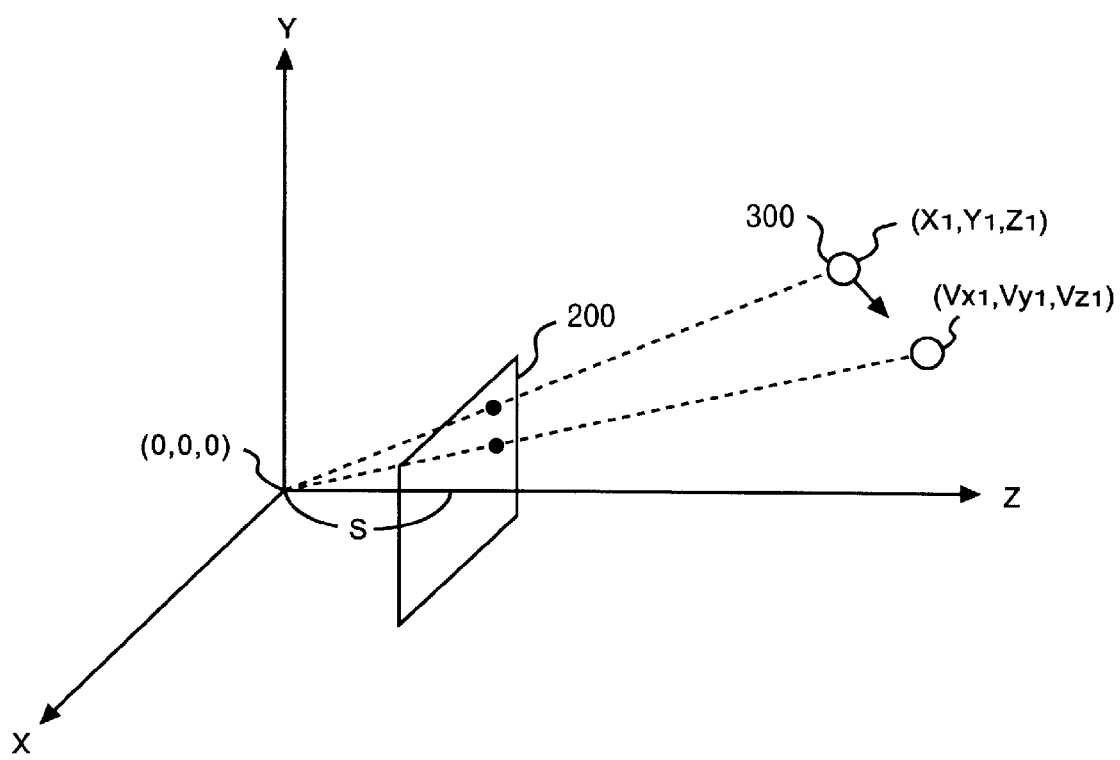
FIG. 4 shows an example of motions of an object 300 in a 3D space and on a screen 200.

FIG. 4 shows an example of motions of an object 300 in a 3D space and on a screen 200. In the 3D space shown in FIG. 4, a viewpoint is set at the origin, e.g., $((x, y, z)=(0, 0, 0))$, of the 3D space. In the 3D space shown in FIG. 4, the screen 200 is provided at a position perpendicular to the Z axis and away from the viewpoint (origin) by a predetermined distance (screen distance S).

Moreover, the object 300 is positioned at arbitrary coordinates $(x_1, y_1, z_1)$ in the 3D space at a time corresponding to a compression target frame. Moreover, the object 300 moves with an arbitrary velocity vector $(Vx_1, Vy_1, Vz_1)$ at the time corresponding to the compression target frame. Note that $Vx_1$ represents a velocity in the X axis direction within the 3D space. Moreover, $Vy_1$ represents a velocity in the Y axis direction within the 3D space. Furthermore, $Vz_1$ represents a velocity in the Z axis direction within the 3D space. In such a case, the frame image generation component 34 acquires, from the 3D data processing component 32, the coordinates $(x_1, y_1, z_1)$ of the object 300 within the 3D space at the time corresponding to the compression target frame. Thereafter, the frame image generation component 34 calculates coordinates $(x, y)$ of the object 300 projected onto the screen 200 by use of the following expression (1):

$$(x, y)=((S/z_1)\times x_1, (S/z_1)\times y_1)) \quad (1)$$

As described above, the frame image generation component 34 calculates the coordinates $(x, y)$ of the object 300 projected onto the screen 200 by multiplying the x coordinate $(x_1)$ and y coordinate $(y_1)$ of the object 300 by a value $(S/z_1)$ obtained by dividing the screen distance S by a distance $z_1$ from the viewpoint to the object 300 on the Z axis. Thus, the frame image generation component 34 can generate an image of the object 300 projected onto the screen 200.

Moreover, in the case as described above, the motion calculating component 36 acquires, from the 3D data processing component 32, the coordinates $(x_1, y_1, z_1)$ and velocity vector $(Vx_1, Vy_1, Vz_1)$ of the object 300 within the 3D space at the time corresponding to the compression target frame. As an example, the motion calculating component 36 may calculate a motion vector of the object 300 projected onto the screen 200 by use of the following expression (2). Note that, in the expression (2), dt represents a time difference between the compression target frame and another frame.

$$(V_x, V_y)=(S_x((x_1+v_{x1}dt/z_1+V_{z1}dt)-x_1/z_1), S_x((y_1+V_{y1}dt/z_1+V_{z1}dt)-y_1/z_1))$$

As described above, the motion calculating component 36 calculates the motion vector from the coordinates of the object 300 on the screen 200, the object being projected onto the screen 200 at a time corresponding to the another frame toward the coordinates of the object 300 on the screen 200, the object being projected onto the screen 200 at the time corresponding to the compression target frame. Thus, the motion calculating component 36 can calculate the motion vector of the object 300 within the screen 200 by projecting the motion of the object 300 within the 3D space onto the screen 200.

Figure 5:
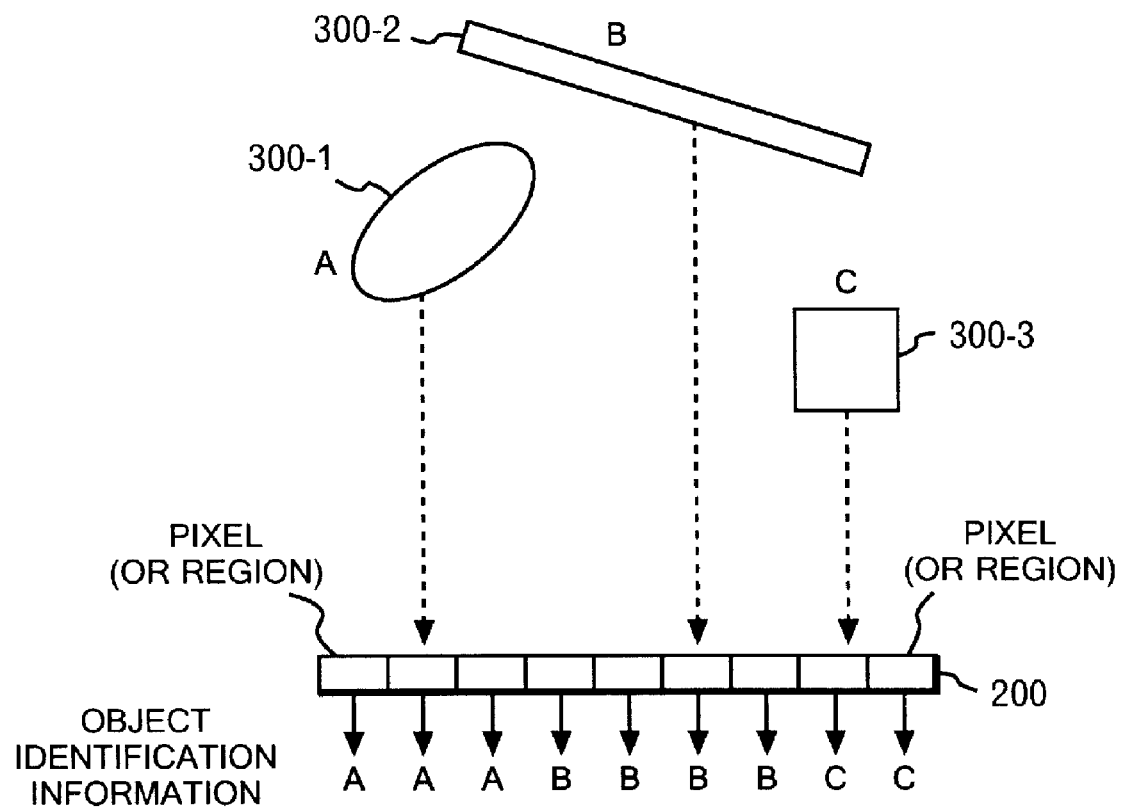
FIG. 5 shows an example of processing of associating object identification information with each of regions in a compression target frame.

FIG. 5 shows an example of processing by associating object identification information with each of the regions in the compression target frame. In the case where a plurality of objects are present in the 3D space, the frame image generation component 34 may generate a compression target frame by projecting the plurality of objects in the 3D space onto the screen 200, for example. Moreover, as an example, the frame image generation component 34 may associate identification information on an object positioned closest to the front of each pixel or region in the compression target frame with the pixel or region.

As an example, the frame image generation component 34 acquires, from the 3D data processing component 32, identification information (A, B, C) on a plurality of objects 300-1, 300-2 and 300-3 as shown in FIG. 5 and information indicating vertex positions of each of the objects. Thereafter, the frame image generation component 34 specifies the object positioned closest to the front of each pixel or region in the compression target frame based on the information indicating the vertex positions of the plurality of objects 300-1, 300-2 and 300-3. Subsequently, the frame image generation component 34 associates the identification information (A, B, C) on the specified object with each pixel or region in the compression target frame.

In the case of calculation of the motion vector in each of the regions of the compression target frame, the motion calculating component 36 specifies an object projected in the region based on identification information associated with the region or each of pixels in the region. Thereafter, the motion calculating component 36 calculates a motion vector by projecting a motion of the specified object within the 3D space onto the screen 200. Thus, in the case where a plurality of objects overlap with each other in the front and back when seen from the viewpoint, the motion of the object projected onto the screen can be reflected on the motion vector by the motion calculating component 36.

Figure 6:
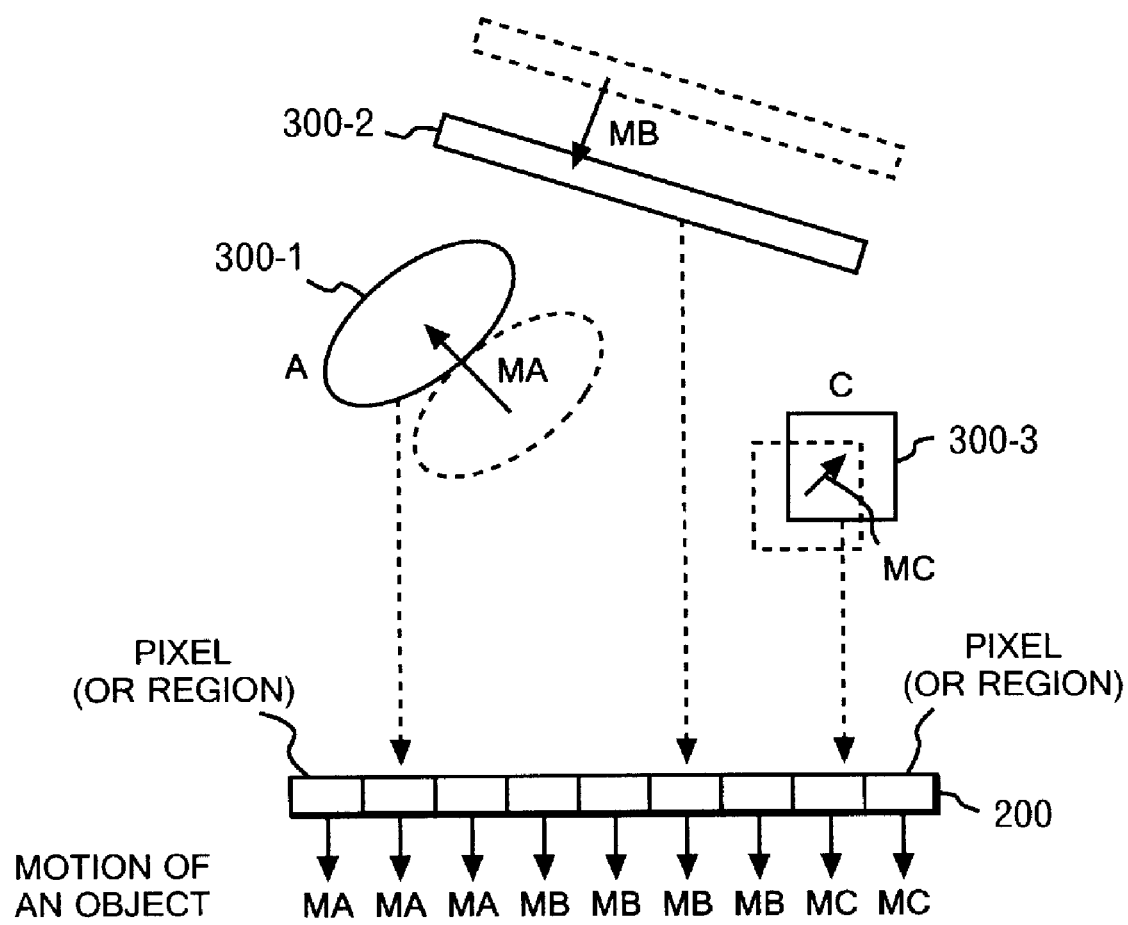
FIG. 6 shows an example of processing of associating a motion of an object with each of the regions in the compression target frame.

FIG. 6 shows an example of processing by associating a motion of an object with each of the regions in the compression target frame. In the case where a compression target frame is generated by projecting a plurality of objects in the 3D space onto the screen 200, the frame image generation component 34 may associate a motion of an object within the 3D space, the object being positioned closest to the front of each pixel or region in the compression target frame, with the pixel or region, for example. As an example, the frame image generation component 34 may associate a velocity vector or the like of the object, as the motion of the object within the 3D space, with the pixel or region.

For example, the frame image generation component 34 acquires, from the 3D data processing component 32, motion information ($M_A$, $M_B$, $M_C$) on a plurality of objects 300-1, 300-2 and 300-3 as shown in FIG. 6 and information indicating vertex positions of each of the objects. Thereafter, the frame image generation component 34 specifies the object positioned closest to the front of each pixel or region in the compression target frame based on the information indicating the vertex positions of the plurality of objects 300-1, 300-2 and 300-3. Subsequently, the frame image generation component 34 associates the motion information ($M_A$, $M_B$, $M_C$) on the specified object with each pixel or region in the compression target frame.

In the case of calculation of the motion vector in each of the regions of the compression target frame, the motion calculating component 36 calculates a motion vector by projecting a motion of the object within the 3D space onto the screen 200, the motion being associated with the region or each of pixels in the region. Thus, in the case where a plurality of objects overlap with each other in the front and back when seen from the viewpoint, the motion of the object projected onto the screen can be reflected on the motion vector by the motion calculating component 36.

Figure 7:
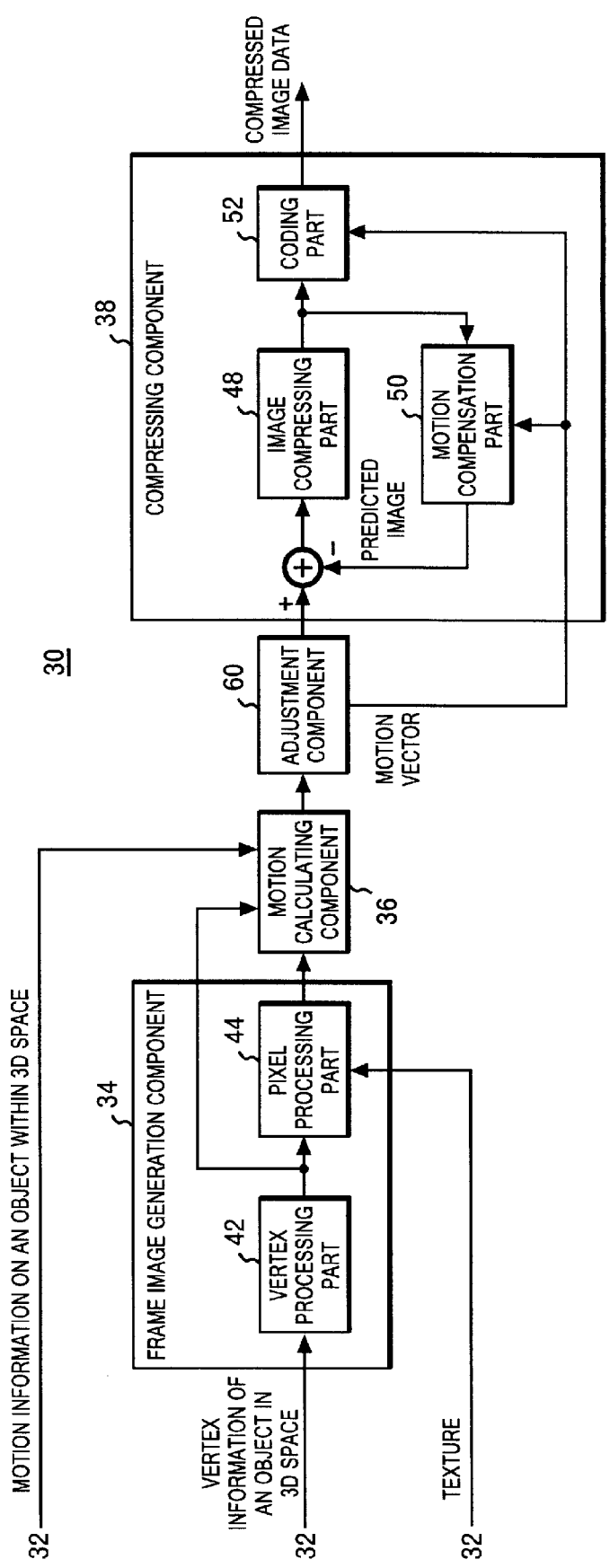
FIG. 7 shows a configuration of a server device 30 according to a first modified example of the embodiment.

FIG. 7 shows a configuration of a server device 30 according to a first modified example of this embodiment. Note that the 3D data processing component 32 is omitted in FIG. 7. Moreover, an information providing system 10 according to this modified example employs approximately the same configuration and functions as those of the information providing system 10 described in FIGS. 1 to 4. Thus, members having approximately the same configuration and functions as those of the members described with reference to FIGS. 1 to 4 will be denoted by the same reference numerals, and description thereof will be omitted below except for differences.

The server device 30 according to this modified example further includes an adjustment component 60. The adjustment component 60 receives the motion vector calculated by the motion calculating component 36. The adjustment component 60 adjusts the motion vector so as to allow an image in a region including an object projected onto a compression target frame and an image in a region specified by a motion vector in another frame to further coincide with each other. Thereafter, the adjustment component 60 transmits the adjusted motion vector to the compressing component 38.

As an example, the adjustment component 60 compares the image in the region (for example, a rectangular block) including the object projected onto the compression target frame with an image in each region obtained by shifting, by a predetermined number of pixels, the region (for example, a rectangular block) which is specified by the motion vector in another frame. For example, the adjustment component 60 calculates, for each of the motion vectors associated with each of the regions in the compression target frame, the degree of coincidence between images in corresponding regions in the compression target frame and images in a plurality of regions obtained by horizontally and vertically shifting the region in another frame specified by the motion vector by several pixels. Note that the adjustment component 60 may shift the region in another frame specified by the motion vector by one pixel or by less than one pixel such as 0.5 pixel. Thereafter, the adjustment component 60 changes the motion vector so as to specify, among the shifted regions on the another frame, one having an image coinciding the most.

Thus, the adjustment component 60 according to this modified example can provide the compressing component 38 with a more accurate motion vector. Furthermore, since the accurate motion vector has been already calculated by the motion calculating component 36, the adjustment component 60 can reduce the extent to which the region is shifted on another frame. Therefore, the server device 30 according to this modified example enables calculation of a more accurate motion vector with a small computational effort.

Figure 8:
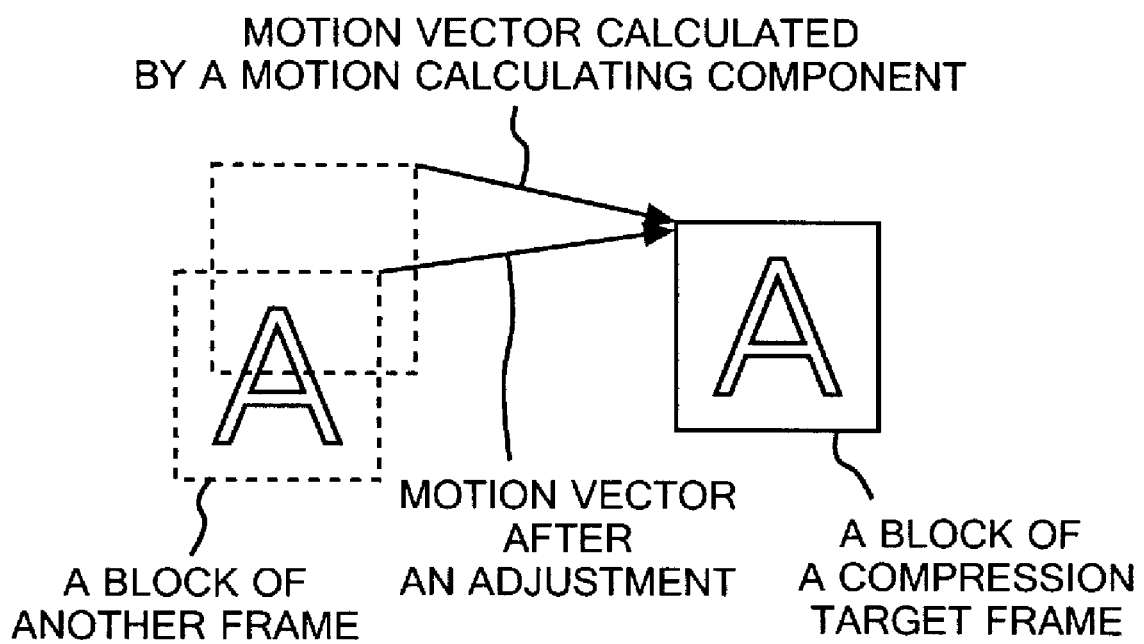
FIG. 8 shows an example of motion vector adjustment.

FIG. 8 shows an example of motion vector adjustment. Note that FIG. 8 shows a motion vector in a direction from another frame to a compression target frame. However, the motion vector may be set in an opposite direction depending on a compression method.

Figure 9:
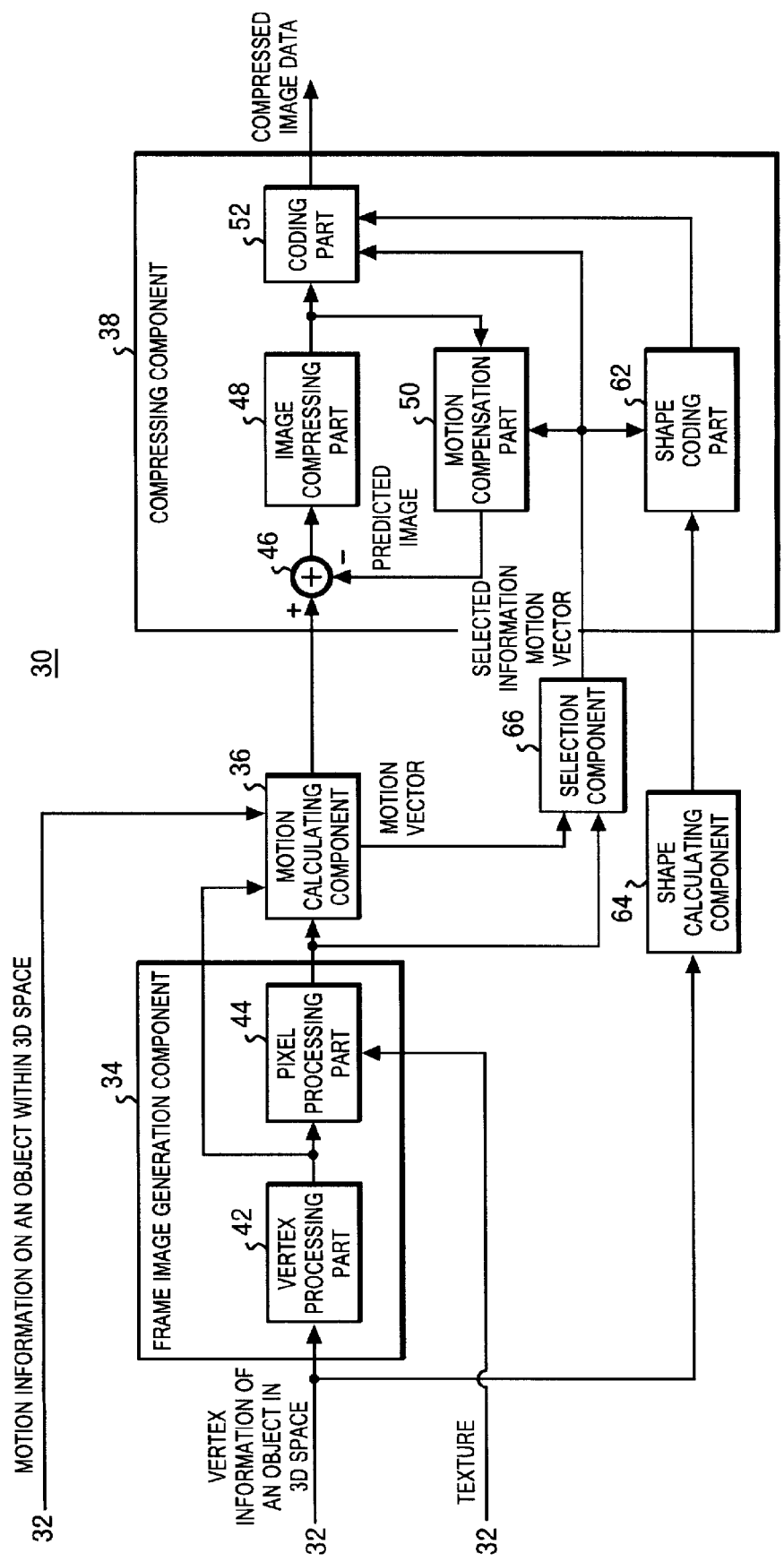
FIG. 9 shows a configuration of a server device 30 according to a second modified example of the embodiment.

FIG. 9 shows a configuration of a server device 30 according to a second modified example of this embodiment. Note that the 3D data processing component 32 is omitted in FIG. 9. The information providing system 10 according to this modified example employs approximately the same configuration and functions as those of the information providing system 10 according to this embodiment described with reference to FIGS. 1 to 4. Accordingly, members having approximately the same configuration and functions as those of the members described with reference to FIGS. 1 to 4 will be denoted by the same reference numerals and description thereof will be omitted below except for differences.

A compressing component 38 according to this modified example further includes a shape coding part 62. Moreover, the server device 30 according to this modified example further includes a shape calculating component 64 and a selection component 66.

The shape coding part 62 generates shape information indicating a shape of a compression target frame. For example, in the motion picture compression method such as MPEG-4, an image having an arbitrary shape, instead of a rectangular image, can be compression-coded. The shape coding part 62 can generate shape information indicating a shape of an image in the case where the image having an arbitrary shape is compression-coded by the compressing component 38.

A coding part 52 according to this modified example performs variable length coding for the shape information generated by the shape coding part 62, in addition to the difference image compressed by the image compressing part 48, the motion vector and the control data. Thereafter, the coding part 52 outputs compressed image data obtained by multiplexing the variable-length-coded difference image, motion vector, control data and shape information. Thus, the compressing component 38 can compress the compression target frame by motion compensation based on the motion vector and the shape. Note that the compressing component 38 may perform image compression by use of the image compression by the image compressing part 48 and the shape coding by the shape coding part 62 without performing the motion compensation using the motion vector.

The shape calculating component 64 calculates a shape of an object projected onto the screen 200 by projecting onto the screen a shape of the object within the 3D space at a time corresponding to the compression target frame. As an example, the shape calculating component 64 receives the information indicating vertex positions of each of the objects in the 3D space, which are processed by the 3D data processing component 32. Thereafter, as an example, the shape calculating component 64 may calculate the shape of each of the objects projected onto the screen by selecting a vertex of the object positioned closest to the front of the screen.

The shape calculating component 64 transmits the calculated shape to the shape coding part 62. Thereafter, based on the shape received from the shape calculating component 64, the shape coding part 62 generates shape information indicating the shape of the image expressed by the compression target frame. Thus, the shape coding part 62 can generate, with a small computational effort, the shape information indicating the shape of the image having an arbitrary shape.

Figure 10:
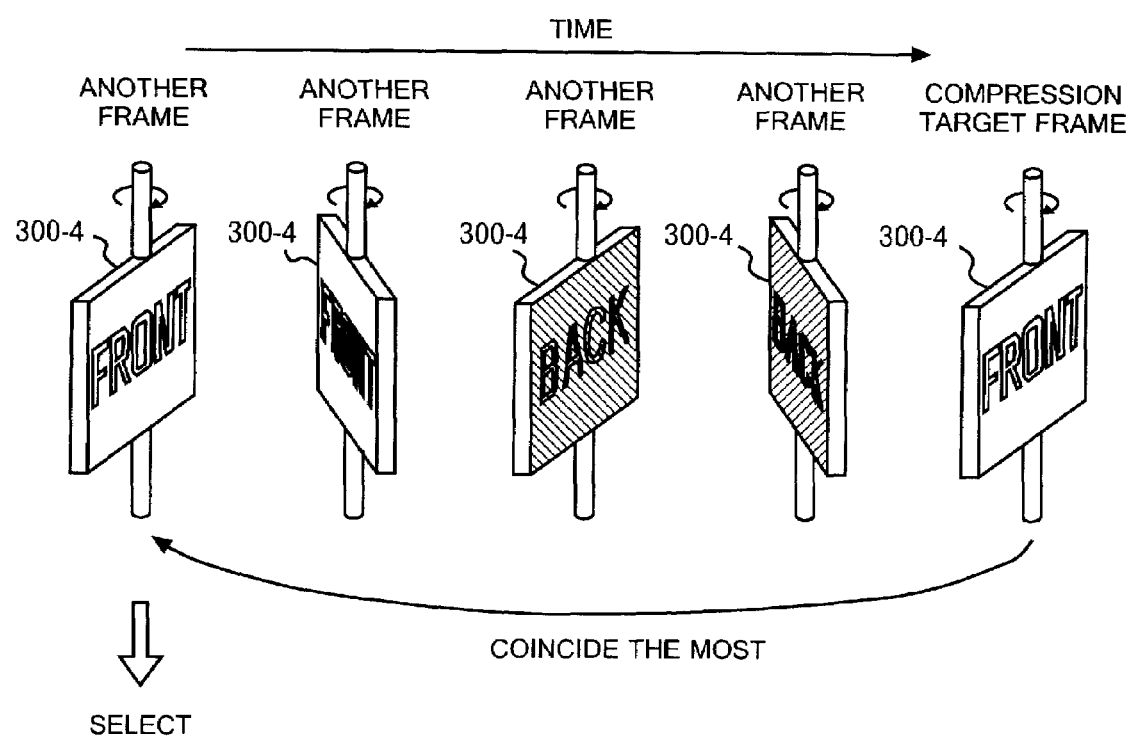
FIG. 10 shows snap shots of a rotating object 300-4 at each of the times corresponding to a plurality of consecutive frames.

FIG. 10 shows snap shots of a rotating object 300-4 at each of the times corresponding to a plurality of consecutive frames. In the second modified example, the motion calculating component 36 calculates a plurality of motion vectors to specify each of the regions for a plurality of other frames by projecting onto the screen 200 motions of the object within the 3D space between the time corresponding to the compression target frame and each of the times corresponding to the plurality of other frames.

The selection component 66 selects another frame, from the plurality of other frames specified by the plurality of motion vectors calculated by the motion calculating component 36, in which an image in the region specified by the corresponding motion vector coincides the most with an image in the region including the object projected onto the compression target frame. As an example, the selection component 66 calculates, for each of the plurality of other frames, the degree of coincidence between the image in the region specified by the corresponding motion vector and the image in the region associated with the motion vector in the compression target frame. Accordingly, the selection component 66 selects another frame having highest coincidence.

Moreover, in this modified example, the compressing component 38 compresses the compression target frame by use of the frame selected by the selection component 66 and by motion compensation based on the motion vector corresponding to the selected frame. Thus, the compressing component 38 can compress the compression target frame by use of the frame having the highest correlation to the compression target frame and by the motion compensation based on the motion vector. For example, even in the case where the object 300-4 is rotated as shown in FIG. 10, the compressing component 38 can compress the compression target frame by use of the frame having the highest correlation and by the motion compensation based on the motion vector. Thus, the motion picture generated by projecting the object in the 3D space onto the screen can be efficiently compressed by the compressing component 38.

Moreover, as an example, the selection component 66 may select another frame instead of that described above, from the plurality of other frames specified by the plurality of motion vectors calculated by the motion calculating component 36, in which a direction of an object is closer to a direction of the object in the compression target frame. Specifically, the selection component 66 may select another frame, from the plurality of other frames specified by the plurality of motion vectors calculated by the motion calculating component 36, in which a posture of the object within the 3D space at a corresponding time is closer to a posture of the object within the 3D space at the time corresponding to the compression target frame. Also in this case, the motion picture generated by projecting the object in the 3D space onto the screen can be efficiently compressed by the compressing component 38.

Figure 11:
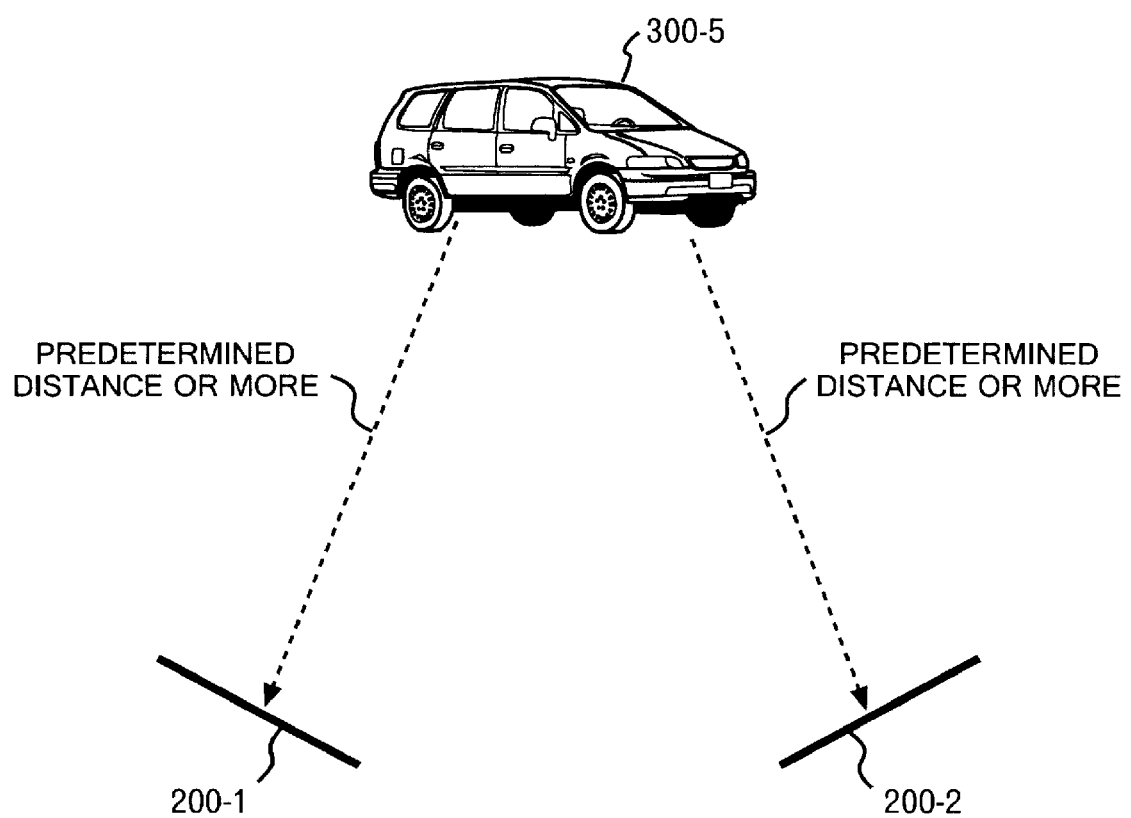
FIG. 11 shows a plurality of screens 200 (for example, a first screen 200-1 and a second screen 200-2), which are provided in the 3D space, and one object 300-5 to be projected onto the plurality of screens 200.

FIG. 11 shows a plurality of screens 200 (for example, a first screen 200-1 and a second screen 200-2), which are provided in the 3D space, and one object 300-5 to be projected onto the plurality of screens 200. The information providing system 10 may compress a plurality of motion pictures generated by projecting the object 300-5 in the 3D space onto each of the plurality of screens 200 (for example, the first and second screens 200-1 and 200-2). As an example, the information providing system 10 may compress a plurality of motion pictures generated by projecting the object 300-5 onto each of the plurality of screens 200 which are set individually by a plurality of different client devices 20.

In this case, on the condition that the object 300-5 is away from the first and second screens 200-1 and 200-2 by a predetermined distance or more, the motion calculating component 36 may use a motion vector obtained by projecting a motion of the object 300-5 onto the first screen 200-1 as a motion vector of the object 300-5 on the second screen 200-2. As an example, the motion calculating component 36 may determine whether or not the object 300-5 is away from the first and second screens 200-1 and 200-2 by the predetermined distance or more by acquiring a position of the object 300-5 in the 3D space and positions of the first and second screens 200-1 and 200-2 from the 3D data processing component 32. The motion calculating component 36 as described above makes it possible to reduce a computational effort required for calculating motion vectors in the case of compressing a plurality of motion pictures.

Figure 12:
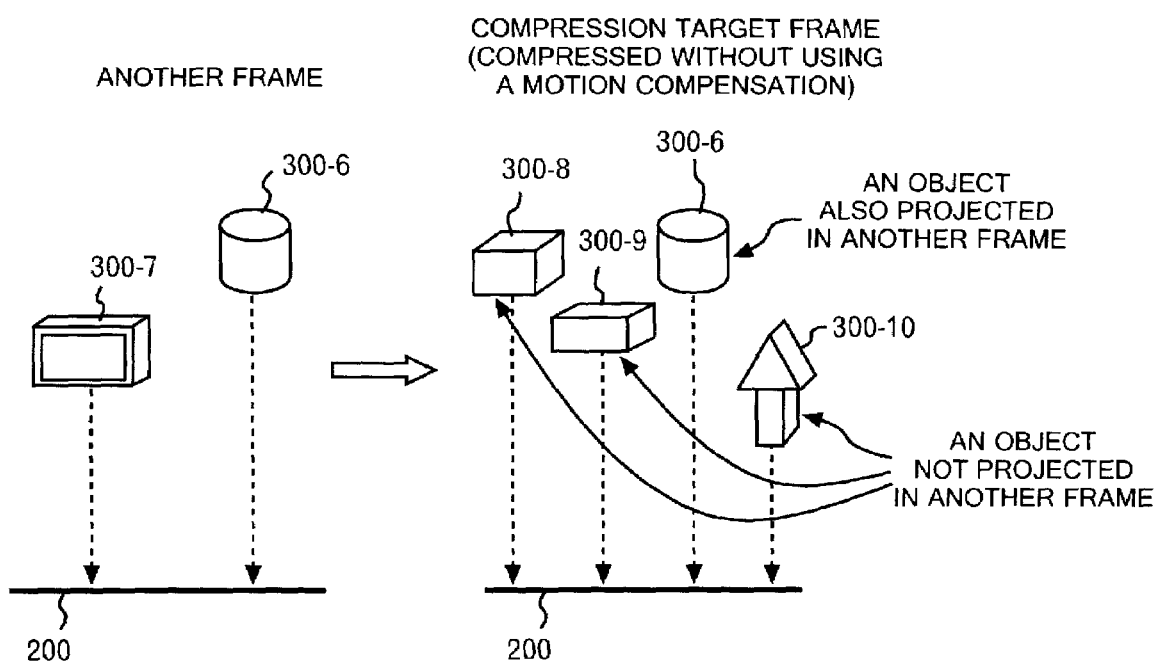
FIG. 12 shows a plurality of objects 300 (300-6 and 300-7), which are projected onto a screen 200 at a time corresponding to another frame, and a plurality of objects 300 (300-6 and 300-8 to 300-10), which are projected onto the screen 200 at a time corresponding to the compression target frame.

FIG. 12 shows a plurality of objects 300 (300-6 and 300-7), which are projected onto the screen 200 at a time corresponding to another frame, and a plurality of objects 300 (300-6 and 300-8 to 300-10), which are projected onto the screen 200 at the time corresponding to the compression target frame. The number of the objects to be projected onto the screen varies with time. Therefore, even the object projected onto the screen 200 at the time corresponding to the compression target frame may not be projected onto the screen 200 at the time corresponding to another frame. In such a case, the compressing component 38 can reduce the post-compression data amount by compressing the motion picture without using the motion vector (in other words, by compressing the motion picture without performing motion compensation using the motion vector). Furthermore, in the case of a transition to a completely different scene, a breakpoint between scenes can be properly indicated by generating an image (e.g., an "I picture" of MPEG) that is not subjected to compression between frames.

Therefore, as an example, the compressing component 38 may compress the compression target frame without using the motion compensation on the condition that, among the plurality of objects projected in the compression target frame, only the objects in less than a predetermined number are also projected in another frame. Here, the predetermined number may be, for example, a number smaller than the number of the plurality of objects projected in the compression target frame. Thus, the motion picture generated by projecting the object in the 3D space onto the screen can be efficiently compressed by the compressing component 38.

Figure 13:
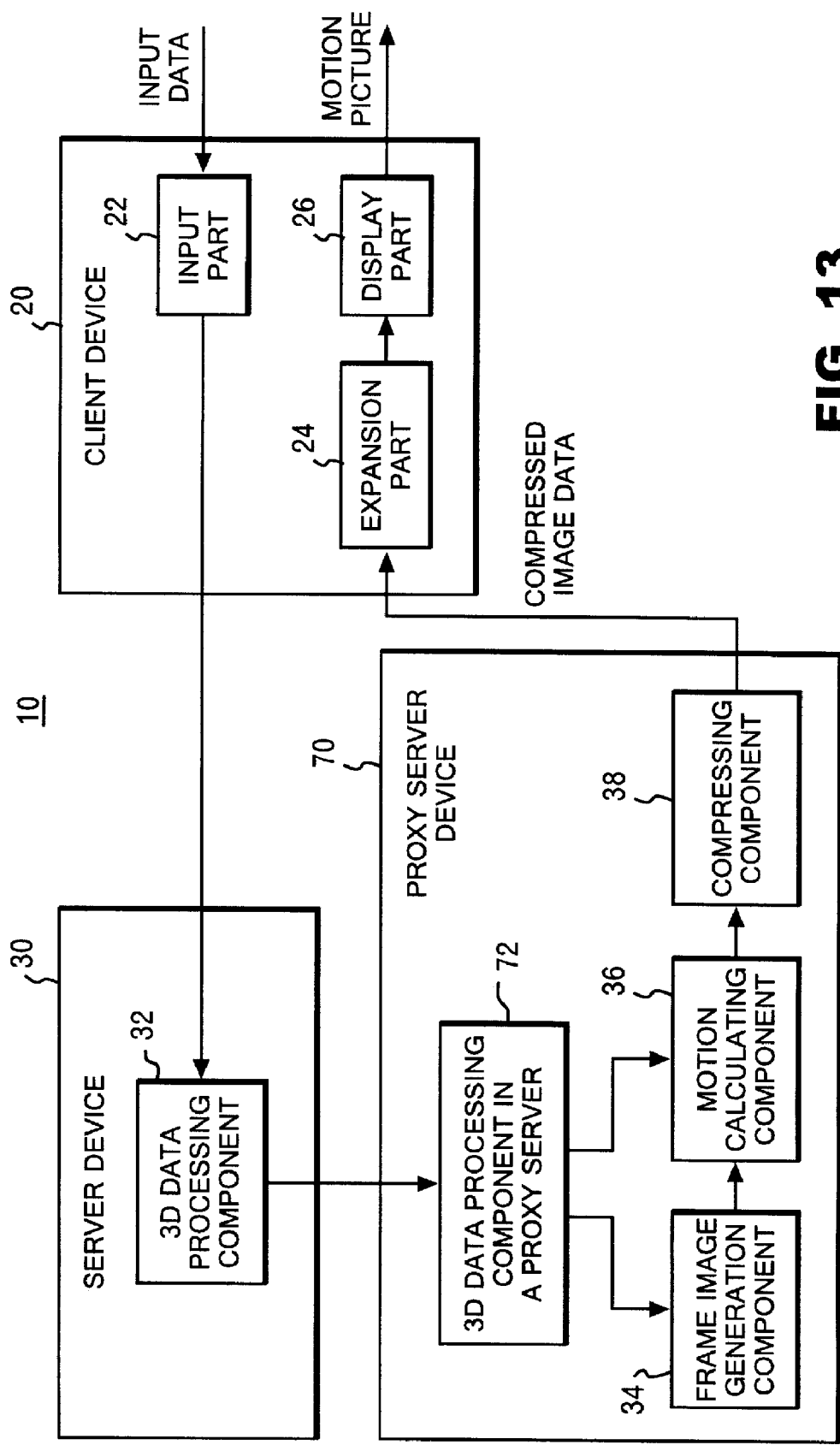
FIG. 13 shows a configuration of an information providing system 10 according to a third modified example of the embodiment.

FIG. 13 shows a configuration of an information providing system 10 according to a third modified example of this embodiment. The information providing system 10 according to this modified example employs approximately the same configuration and functions as those of the information providing system 10 according to this embodiment described with reference to FIGS. 1 to 4. Thus, members having approximately the same configuration and functions as those of the members described with reference to FIGS. 1 to 4 will be denoted by the same reference numerals and description thereof will be omitted below except for differences.

The information providing system 10 according to this modified example may further include a proxy server device 70. The proxy server device 70 includes a 3D data processing component 72 in the proxy server, a frame image generation component 34, a motion calculating component 36 and a compressing component 38. The 3D data processing component 72 in the proxy server receives numeric data from a 3D data processing component 32 in a server device 30, the data indicating position, size, shape, velocity vector, texture and the like of an object in the 3D space. Thereafter, the 3D data processing component 72 in the proxy server transmits the received numeric data to the frame image generation component 34 and the motion calculating component 36.

Instead of the server device 30, the proxy server device 70 described above executes processing of generating a motion picture by projecting an object onto the screen, the object moving relatively to the screen, and of generating compressed image data by compressing the generated motion picture. Moreover, instead of the server device 30, the proxy server device 70 transmits the compressed image data generated to the client device 20.

The information providing system 10 as described above enables reduction in processing load on the server device 30. Moreover, the information providing system 10 as described above makes it possible for the proxy server device 70 provided by a portable telephone company, for example, to provide the compressed image data to the client device 20 through a portable telephone line.

Figure 14:
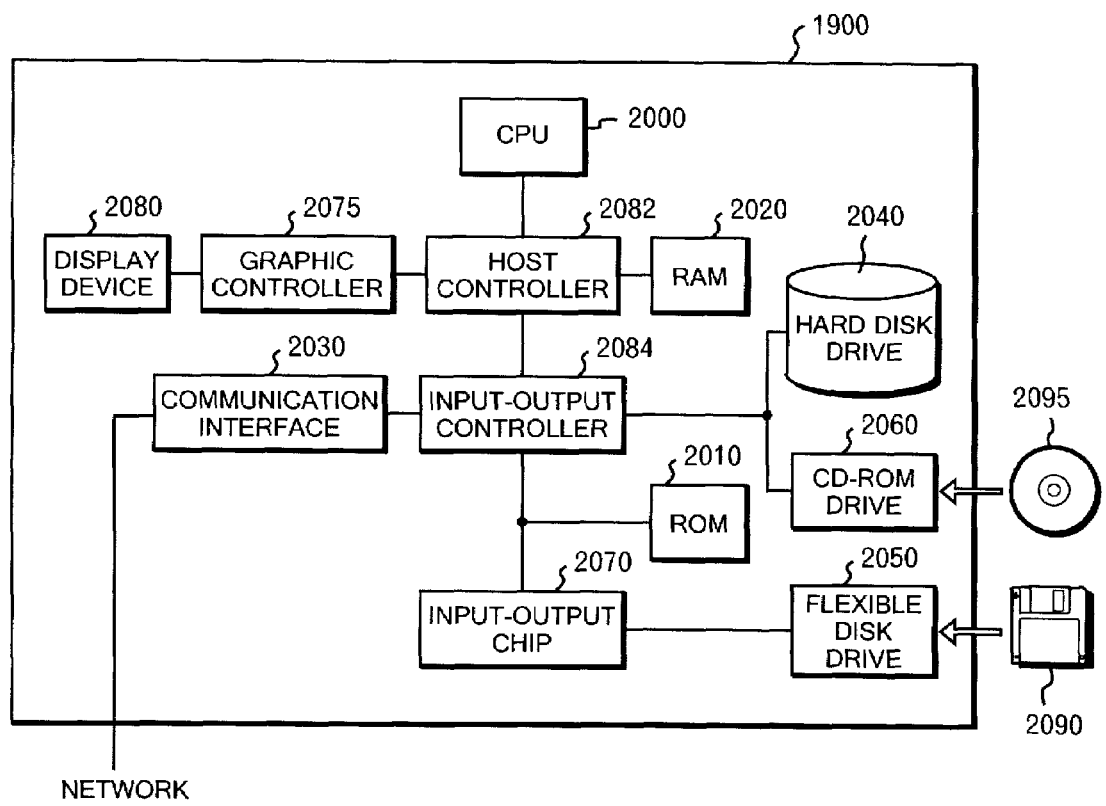
FIG. 14 shows an example of a hardware configuration of a computer 1900 according to the embodiment.

FIG. 14 shows an example of a hardware configuration of a computer 1900 according to this embodiment. The computer 1900 according to this embodiment includes: a CPU peripheral part having a CPU 2000, a RAM 2020, a graphic controller 2075 and a display device 2080, which are connected to each other by a host controller 2082; an input-output part having a communication interface 2030, a hard disk drive 2040 and a CD-ROM drive 2060, which are connected to the host controller 2082 through an input-output controller 2084; and a legacy input-output part having a ROM 2010, a flexible disk drive 2050 and an input-output chip 2070, which are connected to the input-output controller 2084.

The host controller 2082 connects between the RAM 2020, the CPU 2000 which accesses the RAM 2020 at a high transfer rate, and the graphic controller 2075. The CPU 2000 controls each of the parts by operating based on programs stored in the ROM 2010 and the RAM 2020. The graphic controller 2075 acquires image data generated on a frame buffer provided in the RAM 2020 by the CPU 2000 and the like, and displays the image data on the display device 2080. Alternatively, the graphic controller 2075 may include therein a frame buffer for storing the image data generated by the CPU 2000 and the like.

The input-output controller 2084 connects the host controller 2082 to the communication interface 2030, a relatively high-speed input-output device, the hard disk drive 2040 and the CD-ROM drive 2060. The communication interface 2030 communicates with other devices through a network. The hard disk drive 2040 stores programs and data used by the CPU 2000 in the computer 1900. The CD-ROM drive 2060 reads programs or data from a CD-ROM 2095 and provides the read programs or data to the hard disk drive 2040 through the RAM 2020.

Moreover, connected to the input-output controller 2084 are the ROM 2010, the flexible disk drive 2050, and input-output chip 2070 with a relatively low-speed input-output device connected thereto. The ROM 2010 stores a boot program to be executed when the computer 1900 is started, a program dependent on the hardware of the computer 1900, and the like. The flexible disk drive 2050 reads programs or data from a flexible disk 2090 and provides the read programs or data to the hard disk drive 2040 through the RAM 2020. Connected to the input-output chip 2070 are the flexible disk drive 2050 and the input-output devices through a parallel port, a serial port, a keyboard port, a mouse port and the like.

The programs provided to the hard disk drive 2040 through the RAM 2020 are stored in a recording medium, such as the flexible disk 2090, the CD-ROM 2095 and an IC card, to be provided by the user. The programs are read from the recording medium, installed into the hard disk drive 2040 in the computer 1900 through the RAM 2020 and executed by the CPU 2000.

A program installed into the computer 1900 to allow the computer 1900 to function as the server device 30 includes a 3D data processing module, a frame image generation module, a motion calculation module and a compression module. The programs or the modules act on the CPU 2000 and the like and thus allow the computer 1900 to function as the 3D data processing component 32, the frame image generation component 34, the motion calculating component 36 and the compressing component 38.

The programs or modules described above may be stored in an external storage medium. As the storage medium, an optical recording medium such as a DVD and a CD, a magneto optical recording medium such as an MO, a tape medium, a semiconductor memory such as the IC card, and the like can be used besides the flexible disk 2090 and the CD-ROM 2095. Moreover, the programs may be provided to the computer 1900 through the network by using, as the recording medium, a hard disk provided in a server system connected to a dedicated communication network or the Internet, or a storage device such as a RAM.

Although the present invention has been described above by use of the embodiment, the technical scope of the present invention is not limited to that described in the foregoing embodiment. It is apparent to those skilled in the art that various changes or modifications can be added to the foregoing embodiment. It is apparent from the description of the scope of claims that embodiments to which such changes or modifications are added can also be included in the technical scope of the present invention.

What is claimed is:

1. A system for compressing a motion picture generated by projecting objects onto a screen, the objects moving relatively to the screen in a three-dimensional (3D) space, the system comprising:

a motion calculating component which calculates a motion vector of the object within the screen by projecting onto the screen a motion of the object in the 3D space between a time corresponding to a target frame to be compressed and a time corresponding to another frame; and a compressing component which compresses the compression target frame by motion compensation based on the motion vector, wherein the compressing component compresses a difference image obtained by subtracting an image in a region in the another frame from an image in a region including the object projected onto the compression target frame, the another frame being specified by the motion vector associated with the region including the object; and, an adjustment component which adjusts the motion vector so as to allow the image in the region including the object projected onto the compression target frame and the image in the region specified by the motion vector in the another frame to further coincide with each other, said adjustment component comparing the image in the region including the object projected onto the compression target frame with images in each region obtained by shifting, by a value within a predetermined range in number of pixels, the region specified by the motion vector in the another frame, and changes the motion vector so as to specify, among the shifted regions on the another frame, one having an image coinciding the most.

2. The system according to claim 1, further comprising:
a frame image generation component which generates the compression target frame by projecting a plurality of the objects in the 3D space onto the screen,
wherein the frame image generation component associates identification information on the object positioned closest to the front of each pixel or region in the compression target frame with the pixel or region, and
in the case of calculation of the motion vector in each of the regions of the compression target frame, the motion calculating component specifies an object projected in the region based on identification information associated with the region or each of pixels in the region, and calculates the motion vector by projecting a motion of the specified object within the 3D space onto the screen.

3. The system according to claim 1, further comprising:
a frame image generation component which generates the compression target frame by projecting a plurality of the objects in the 3D space onto the screen, wherein the frame image generation component associates a motion of the object within the 3D space, the object being positioned closest to the front of each pixel or region in the compression target frame, with the pixel or region, and
a motion calculating component which, in the case of calculation of the motion vector in each of the regions of the compression target frame, calculates the motion vector by projecting a motion of the object within the 3D space onto the screen, the motion being associated with the region or each of pixels in the region.

4. The system according to claim 1, further comprising:
a frame image generation component which generates the compression target frame by projecting a plurality of the objects in the 3D space onto the screen,
wherein the motion calculating component associates with each of the regions in the compression target frame the motion vector calculated for the object positioned closest to the front of the region, and
wherein the compressing component performs motion compensation based on the motion vector associated with the region in the compression target frame in the case of compression of an image in each region.

5. The system according to claim 1, further comprising:
a shape calculating component which calculates a shape of the object projected onto the screen by projecting onto the screen a shape of the object within the 3D space at a time corresponding to a compression target frame,
wherein the compressing component compresses the compression target frame by motion compensation based on the motion vector and the shape.

6. The system according to claim 1, wherein:
the system compresses each of a plurality of motion pictures generated by projecting the object in the 3D space onto a plurality of screens, and
the motion calculating component uses the motion vector obtained by projecting a motion of the object onto a first screen as a motion vector of the object on a second screen provided that the object is away from a first one of the screens as well as a second one of the screens by a predetermined distance.

7. The system according to claim 1, further comprising:
a selection component which selects, from the plurality of other frames, another frame in which an image in the region specified by the corresponding motion vector coincides the most with an image in the region including the object projected onto the compression target frame;
wherein the motion calculating component calculates a plurality of motion vectors to specify each of the regions in a plurality of other frames by projecting onto the screen motions of the object within the 3D space between the time corresponding to the compression target frame and times corresponding to the plurality of other frames, and
wherein the compressing component compresses the compression target frame by motion compensation based on the another frame selected by the selection component and the motion vector corresponding to the selected another frame.

8. The system according to claim 1, further comprising:
a selection component which selects, from the plurality of other frames, another frame in which a direction of the object is closer to a direction of the object in the compression target frame;
wherein the motion calculating component calculates the motion vector by projecting onto the screen the motion of the object within the 3D space between the time corresponding to the compression target frame and the time corresponding to the selected another frame.

9. The system according to claim 1, wherein the compressing component compresses the compression target frame without using the motion compensation on the condition that, among the plurality of objects projected in the compression target frame, only the objects in less than a predetermined number are also projected in another frame.

10. A computer readable article of manufacture tangibly embodying computer readable instructions to control a system for compressing a motion picture generated by projecting an object onto a screen, the object moving relatively to the screen in a 3D space, wherein the program allows the computer to function as:
a motion calculating component which calculates a motion vector of the object within the screen by projecting onto the screen a motion of the object in the 3D space between a time corresponding to a compression target frame and a time corresponding to the another frame; and
a compressing component which compresses the compression target frame by motion compensation based on the motion vector, wherein the compressing component compresses a difference image obtained by subtracting an image in a region in another frame from an image in a region including the object projected onto the compression target frame, another frame being specified by the motion vector associated with the region including the object; and
an adjustment component which adjusts the motion vector so as to allow the image in the region including the object projected onto the compression target frame and the image in the region specified by the motion vector in the another frame to further coincide with each other, said adjustment component comparing the image in the region including the object projected onto the compression target frame with images in each region obtained by shifting, by a value within a predetermined range in number of pixels, the region specified by the motion vector in the another frame, and changes the motion vector so as to specify, among the shifted regions on the another frame, one having an image coinciding the most.

11. A method for compressing a motion picture generated by projecting an object onto a screen, the object moving relatively to the screen in a 3D space, the method comprising the steps of:
- calculating a motion vector of the object within the screen by projecting onto the screen a motion of the object in the 3D space between a time corresponding to a compression target frame and a time corresponding to another frame;
- compressing the compression target frame by motion compensation based on the motion vector, wherein the compressing including compressing a difference image obtained by subtracting an image in a region in the another frame from an image in a region including the object projected onto the compression target frame, the another frame being specified by the motion vector associated with the region including the object; and
- adjusting the motion vector so as to allow the image in the region including the object projected onto the compression target frame and the image in the region specified by the motion vector in the another frame to further coincide with each other, said adjusting comprising:
- comparing the image in the region including the object projected onto the compression target frame with images in each region obtained by shifting, by a value within a predetermined range in number of pixels, the region specified by the motion vector in the another frame, and changes the motion vector so as to specify, among the shifted regions on the another frame, one having an image coinciding the most.

12. A computer readable article of manufacture tangibly embodying computer readable instructions for executing the steps of a method of compressing a motion picture generated by projecting an object onto a screen, the object moving relatively to the screen in a 3D space, the method comprising:
- calculating a motion vector of the object within the screen by projecting onto the screen a motion of the object in the 3D space between a time corresponding to a compression target frame and a time corresponding to another frame; and
- compressing the compression target frame by motion compensation based on the motion vector, wherein the compressing including compressing a difference image obtained by subtracting an image in a region in the another frame from an image in a region including the object projected onto the compression target frame, the another frame being specified by the motion vector associated with the region including the object; and,
- adjusting the motion vector so as to allow the image in the region including the object projected onto the compression target frame and the image in the region specified by the motion vector in the another frame to further coincide with each other, said adjusting comprising:
- comparing the image in the region including the object projected onto the compression target frame with images in each region obtained by shifting, by a value within a predetermined range in number of pixels, the region specified by the motion vector in the another frame, and changes the motion vector so as to specify, among the shifted regions on the another frame, one having an image coinciding the most.

* * * * *